United States Patent [19]

Behr et al.

[11] Patent Number: 5,143,010
[45] Date of Patent: Sep. 1, 1992

[54] APPARATUS FOR SECURING CONTAINERS ON TRANSPORT VEHICLES

[75] Inventors: Peter Behr; Matthias Horstmann, both of Hamburg, Fed. Rep. of Germany

[73] Assignee: MEC Marine Equipment and Consulting Behr and Horstmann GmbH, Hamburg, Fed. Rep. of Germany

[21] Appl. No.: 593,211

[22] Filed: Oct. 4, 1990

[30] Foreign Application Priority Data

Oct. 4, 1989 [DE] Fed. Rep. of Germany ....... 3933131

[51] Int. Cl.$^5$ .......................................... B63B 25/24
[52] U.S. Cl. ..................................... 114/75; 248/499; 410/96; 410/120
[58] Field of Search .................. 114/75, 109, 251; 24/265 CD; 403/43, 44; 248/499, 500, 503; 410/77, 85, 96, 100, 120; 29/175.1

[56] References Cited

U.S. PATENT DOCUMENTS 2,359,492 10/1944 Rockwood et al. ................ 403/43
3,551,959 1/1971 Mastalski ............................ 403/43
3,719,377 3/1973 Schultz et al. ..................... 403/44

FOREIGN PATENT DOCUMENTS 344635 12/1989 European Pat. Off. ............. 114/75
6309021 12/1969 Netherlands ......................... 114/75

Primary Examiner—Sherman Basinger
Attorney, Agent, or Firm—Robert W. Becker & Associates

[57] ABSTRACT

An apparatus for securing containers on transport vehicles, especially ships, which comprises a connecting device, a first end of which is connectable to the containers, and a clamping device, a first end of which is equipped with a longitudinally adjustable threaded spindle and connectable to the transport vehicle and a second end of the connecting device comprising a number of fastening stops with which a second end of the clamping device is connectable to said connecting device in suitably chosen increments. The clamping device comprises a sliding carriage which receives the fastening stops and which is essentially freely movable in the axial direction of the clamping device.

12 Claims, 5 Drawing Sheets

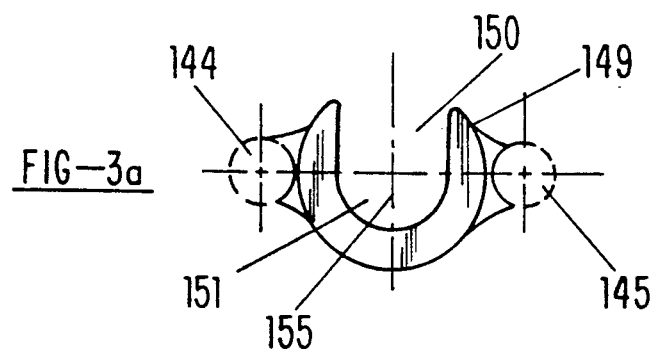
FIG-3a
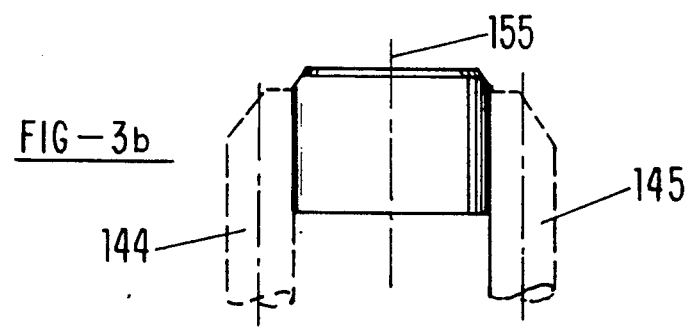
FIG-3b
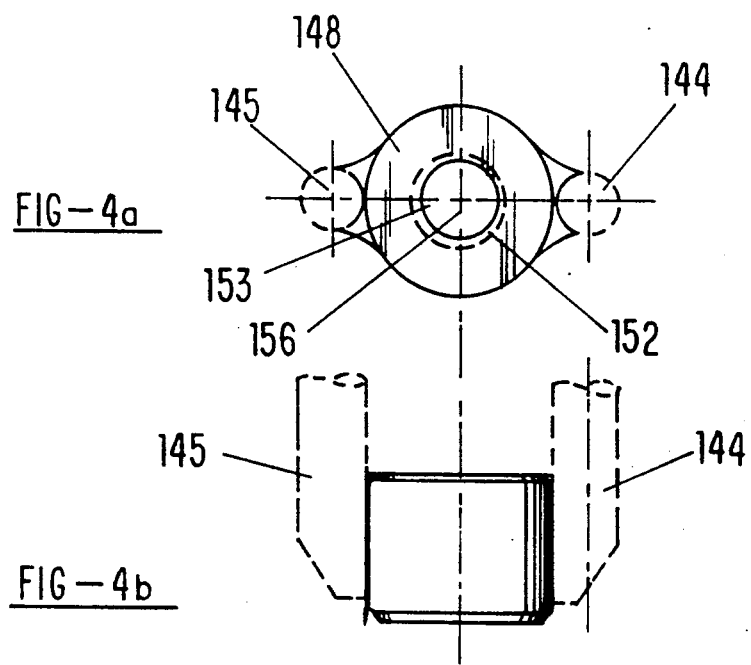
FIG-4a
FIG-4b

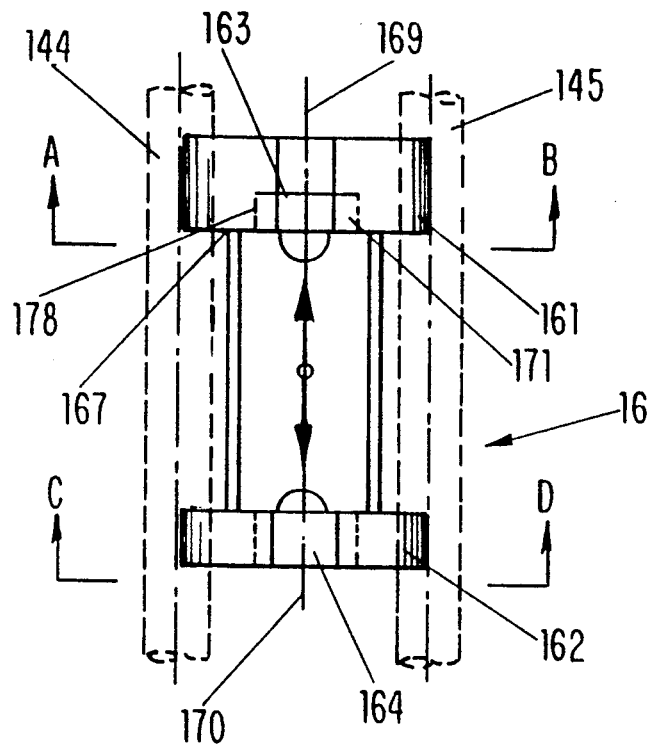
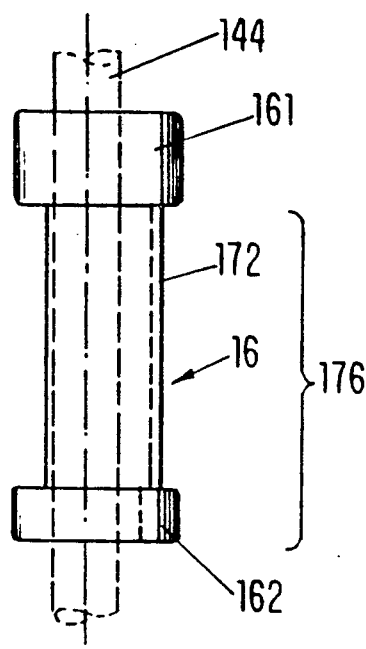
FIG-5a
FIG-5b
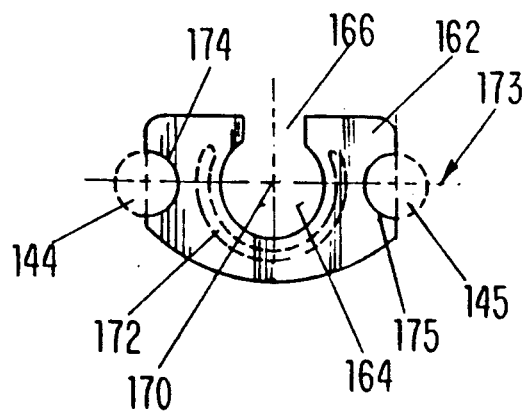
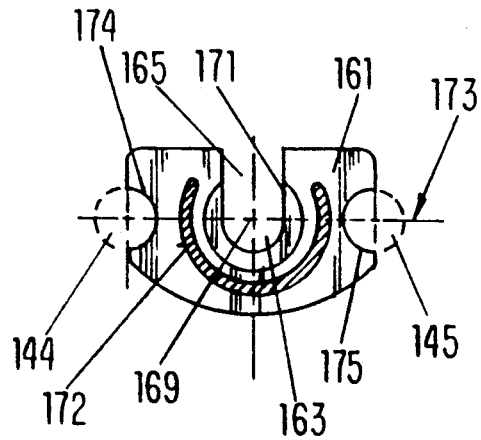
SECTION-C-D
FIG-6a
SECTION A-B
FIG-6b

APPARATUS FOR SECURING CONTAINERS ON TRANSPORT VEHICLES

BACKGROUND OF THE INVENTION

The present invention relates to an apparatus for securing containers on transport vehicles, especially ships, comprising a connecting device, a first end of which is connectable to said containers, and a clamping device a first end of which is equipped with a longitudinally adjustable threaded spindle and connectable to said transport vehicle and a second end of which comprises a number of fastening stops with which a second end of said clamping device is connectable to said connecting device in suitably chosen increments.

A securing apparatus as described above is known from the German document DE-Gbm 88 07 164. On transport vehicles, such as ocean-going ships, containers are stacked on the deck next to each other and on top of each other. In order to secure them against sliding they are connected to each other and to the deck in a force-locking manner. The first securing apparatus used to fasten the containers on the deck of a ship consisted of rope- or rod-like devices, one end of which was fastened to the corner fitting of the containers and the other end was attached to fastening elements such as eyebolts fixed to the deck of the ship, via conventional, longitudinally adjustable clamping bolts.

However, the loading and securing of containers with the means described above is relatively time consuming, because the adjustment of the length of the connecting device to the distance between the fastening opening at the container and the fastening element at the deck has to be accomplished by turning the spindle of the clamping bolt. This step has to be carried out by several persons at the same time in order to keep the loading time to an acceptable limit.

Several improvements of the known securing apparatus have been suggested. For example, the connecting device is provided with several suitable fastening stops, spaced from each other, which allow for a coarse adjustment of the distance between the fastening opening at the container and the fastening element at the deck. After the coarse adjustment has been achieved, the fastening stops then are engaged, at an end opposite the threaded spindle, at a protrusion which is formed as an end cap of the known clamping device. In the known clamping devices, the threaded spindle is guided in a sliding block, which has a threaded through hole to receive the threaded spindle in a rotating fashion. For the fine adjustment of the clamping device via the interacting threaded spindle, the sliding block, in the form of a spindle nut, is arranged in a slidable manner relative to the direction of the longitudinal axis of the clamping device. The protrusion that receives the fastening stop may freely slide in the direction of the connecting device, which is to be coupled to the clamping device, until the selected fastening stop chosen for the coarse adjustment is positioned far enough behind the protrusion of the clamping device to be engaged and, in a motion that axially extends in the longitudinal direction of the securing apparatus, locked and held behind the protrusion. Subsequently, the final securing of the connection is achieved by turning the threaded spindle of the clamping device, until the sliding block of the clamping device rests at the end of the clamping device that faces away from the connecting device. Further turning of the threaded spindle finally adjusts the distance by shortening the total length of the securing apparatus A disadvantage of this known securing apparatus is that, for the coarse adjustment of the length of the securing apparatus, the clamping device must be slid onto the selected fastening stop and, in order to catch and lock the fastening stop of the connecting device, the entire clamping device has to be lifted. This requires a lot of strength from the person securing the containers, since the clamping device by itself has a considerable weight. In addition, the lifting of the entire clamping device bears the risk of injuring the operator, because the securing apparatus parts may slide apart. It is also disadvantageous, that the sliding block, formed as a spindle nut and slidable in a longitudinal direction, must run very precisely in suitable guides of the clamping device in order to have the thread of the threaded spindle axially aligned to the clamping device at all times. The construction and manufacture of such guide elements is labor intensive and difficult. Therefore, the clamping devices of the known securing apparatus are rather costly.

It is therefore an object of the present invention to provide a securing apparatus which handles easily without the risk of causing injury, thereby saving personnel during the loading operation of the containers, and which may be manufactured at low cost.

BRIEF DESCRIPTION OF THE DRAWINGS

This object, and other objects and advantages of the present invention, will appear more clearly from the following specification in conjunction with the accompanying drawings, in which:

FIG. 3a is an enlarged bottom view of the clamping device of FIG. 1;

FIG. 3b is a part-sectional top view of the clamping device in FIG. 3a;

FIG. 4a is an enlarged top view of the clamping device of FIG. 1 without the threaded spindle;

FIG. 4b is a part-sectional top view of the clamping device represented in FIG. 4a;

FIG. 5a is a top view of the sliding carriage, partially showing the clamping device;

FIG. 5b is a side view of the representation of FIG. 5a;

FIG. 6a is a cross-sectional view along the line C-D of FIG. 5a;

FIG. 6b is a cross-sectional view along the line A-B of FIG. 5a; and

SUMMARY OF THE INVENTION

Figure 1:
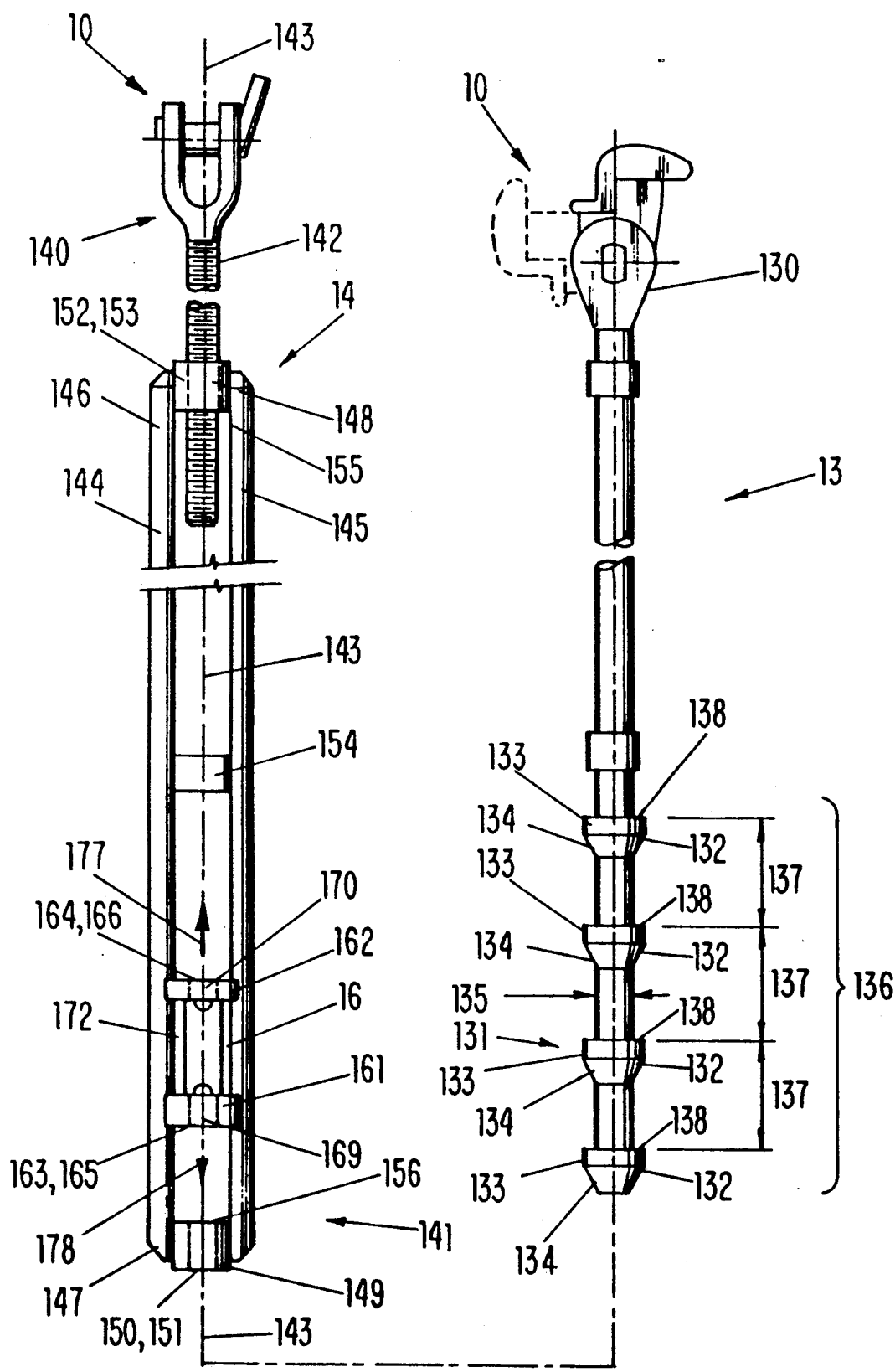
FIG. 1 is a top view of the clamping device and the connecting device of the securing apparatus, in which the dashed lines connecting the clamping and the connecting devices represents the connection of the clamping and the connecting device.

The securing apparatus of the present invention is primarily characterized by a clamping device comprising a sliding carriage for receiving fastening stops, wherein the sliding carriage is essentially freely movable in an axial direction of the clamping device.

The advantage of the securing apparatus of the present invention is that the sliding carriage may be effortlessly moved inside the clamping device until it reaches a position which corresponds to the respective selected fastening stop of the connecting device. The fastening stop is then engaged by the sliding carriage and locked to it.

In general, there are various possibilities to connect the fastening stops to the sliding carriage in a releasable manner. However, it is advantageous to provide the sliding carriage with at least one jaw-shaped cross-piece for introducing and receiving the fastening stops. The jaw-shaped cross-piece is a very simple and effective fastening means.

In a preferred embodiment of the securing apparatus of the present invention, the cross-piece is provided with a through hole with a radial opening for introducing and receiving the connecting device. Thereby it is possible to pass a section of the connecting device, located between two spaced fastening stops, through these through holes with radial openings of the cross-piece and then pull the connecting device in the direction of the clamping action, axial to the through hole, so that the fastening stops will rest at the rim of the through hole, respectively at the cross-piece.

In order to increase the engaging and locking security in the area of the through holes of the cross-piece, the through hole of the first cross-piece is preferably equipped with, on the side facing the threaded spindle, a recessed portion, or a catch basin, which is essentially arranged axially to the axis of the through hole. When the securing apparatus is under load, the fastening stops rest at least partially at the axial recessed portion. The recessed portion may be of a cylindrical shape.

For the functioning of the securing apparatus it would be sufficient to provide the sliding carriage with only one cross-piece for introducing and/or receiving of the connecting device. It is, however, preferable to equip the sliding carriage with two spaced cross-pieces, which are connected via a spacing element. Usually, the cross-pieces each have identical through holes with radial openings, but it is sufficient, as mentioned above, to provide only the through hole of the first cross-piece, on a side facing the threaded spindle, with an axial recessed portion, while the second cross-piece, which is facing the threaded spindle, only needs to be equipped with a through hole with a radial opening without a recessed portion. The diameter of the through hole of the second cross-piece, however, is so large, that the fastening stop with its cylindrical section is freely movable in this through hole. During the locking process, the connecting device is supported with only one fastening stop at the bottom of the recessed portion when the securing apparatus is under load in an axial direction At the same time, the cross-piece provides radial support for the fastening stops, introduced in an axial direction into the through holes of the respective cross-pieces, i.e., the through holes with radial openings do not allow the slipping of the fastening stops from the through holes.

The spacing element of the two cross-pieces of the sliding carriage may be formed in a suitable manner. For example, they may be in the form of cross-pieces or rods, which serve the sole purpose of keeping cross-pieces of the sliding carriages spaced at a suitable selected distance. It is preferable to shape the spacing element such that it has a U-shaped cross-section. The spacing element may be formed from a tube with a circular cross-section, with its upper tube portion removed.

The sliding carriage may be arranged in the clamping device on suitable guides. In order to achieve an inexpensive construction, however, the cross-piece is preferably equipped with two opposite guide slots, that are arranged essentially parallel to the axis of the through hole and in the same axial plane and are movable in respective guides in the axial direction of the clamping device.

In order to provide guide elements for the sliding carriage, respectively the corresponding guide slots in the cross-pieces, the clamping device is preferably comprised of two essentially parallel rods, which are provided with first and second end caps at their respective first and second ends. The end caps are preferably connected to the parallel rods by welding. However, it is also possible to provide the ends of the rods with threads which engage the respective threaded holes provided in the end caps.

In a further embodiment of the securing apparatus of the present invention, the second end cap, which is facing the fastening stop, has a through hole with a radial opening through which said connecting device is passed, while the first end cap facing the transport vehicle is equipped with a threaded through hole which receives the threaded spindle.

The through hole with a radial opening of the second end cap allows for the unhindered axial passage of the fastening stops, when the fastening stops are introduced in the through holes of the cross-pieces, respectively in the recessed portion of the one cross-piece. Therefore, an unhindered movability of the sliding carriage with the fastening stops, respectively the connecting device, to be introduced therein, is achieved In order to achieve the unhindered movability of the sliding carriage, the axes of the through holes of the end caps, which form essentially the axis of the clamping device, are preferably aligned with the axes of the through holes of the cross-pieces This is also desirable for the axis of the threaded spindle, so that, during the clamping operation, the securing apparatus is not canted and is easily operated.

The rods which form the clamping device may be of a suitable length, so that, independent of the varying longitudinally adjustable embodiments of the connecting device, spacing bodies or elements for the bridging of distances between the corners of a container and the fastening elements at the deck of a ship are dispensable with only a few clamping devices of different rod lengths. When the rods of the clamping device are relatively long, it may be advantageous to introduce at least one intermediate element, between the first and the second end cap, which is attached to the two rods by a weld connection or another suitable fixation, so that the structural stability of the clamping device is increased and the unhindered movability of the sliding carriage is assured.

The connecting device, which also encompasses a fastening element for the fastening at the corner fittings of a container, may be suitably constructed, for example, from a flexible rope, a massive rod-like part, or a combination of a rope and a rod. It is also possible to employ a chain for the distance bridging portion of the connecting device, for example, in connection with a steel cable and/or a rod.

The fastening stops of the connecting device comprise preferably a cylindrical section and an adjoining conical section, each having a respective smallest cross-sectional diameter that corresponds essentially to a cross-sectional width of said connecting device which, at least in this area, is rod-shaped.

In order to assure that, in a sliding carriage comprising two spaced cross-pieces, both respective fastening stops which engage the cross-pieces remain in the through holes during the engaging stage and do not slip out in a radial direction, the distance between the two neighboring fastening stops equals essentially the distance between the two cross-pieces of the sliding carriage.

DESCRIPTION OF PREFERRED EMBODIMENTS

The present invention will now be described in detail with the aid of several specific embodiments utilizing FIGS. 1 through 7.

Figure 2:
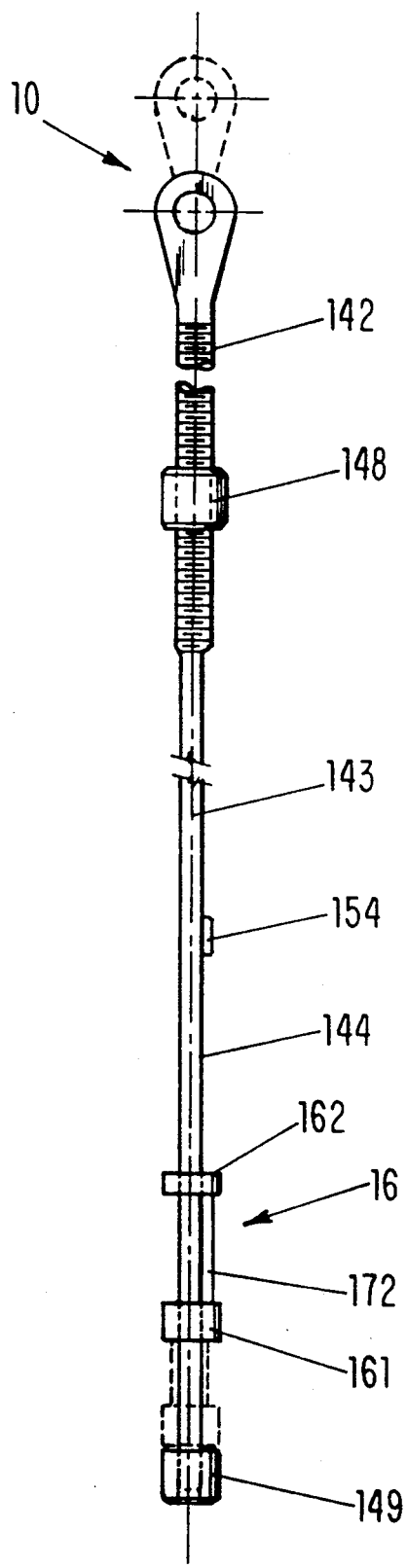
FIG. 2 is a side view of the clamping device represented in FIG. 1.
Figure 7A:
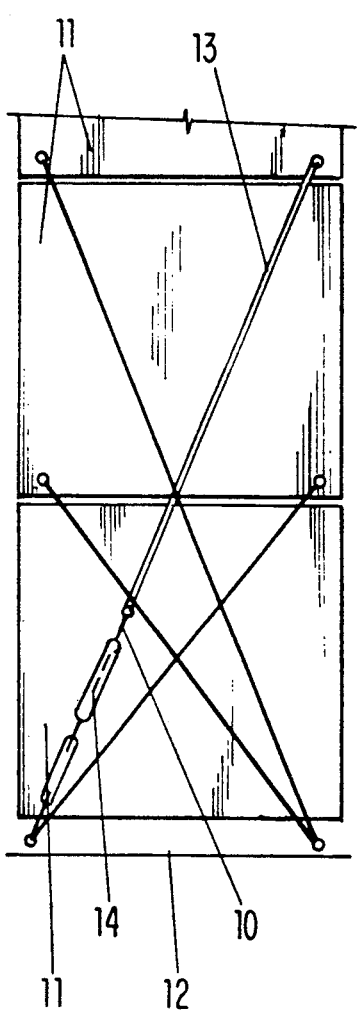
FIG. 7a-c show different attachments of the securing apparatus, comprising a connecting device and a clamping device, for securing containers of different sizes to each other and to the deck of a ship.
Figure 7B:
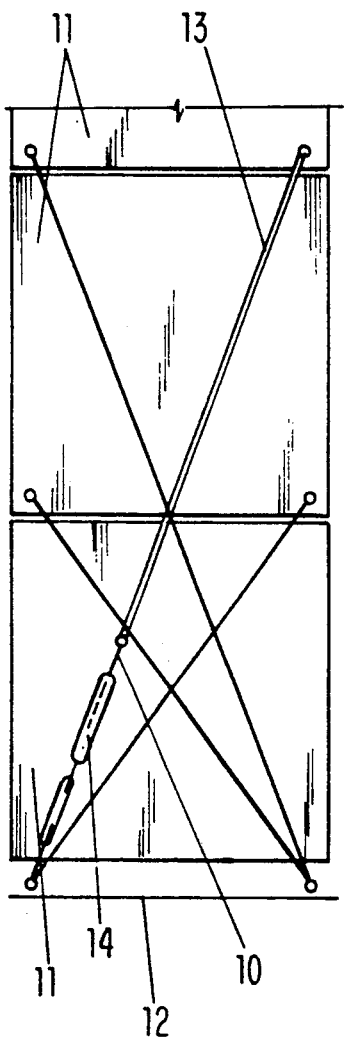
Figure 7C:
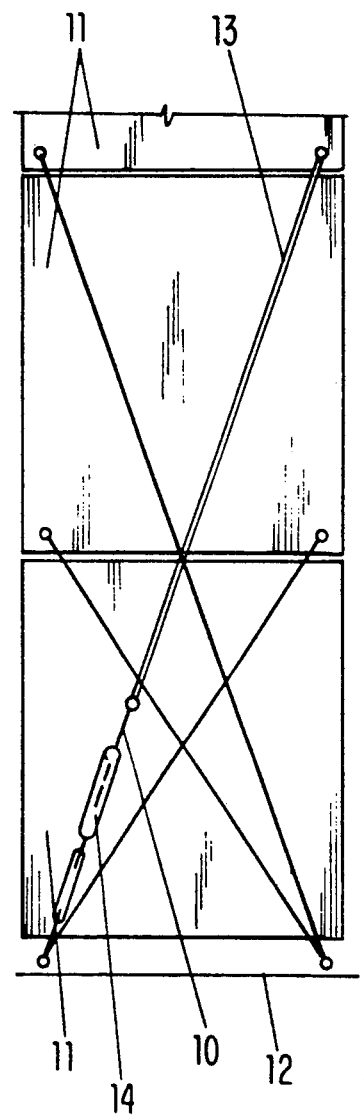

The securing apparatus 10 for securing containers on transport vehicles 12 comprises essentially a clamping device and a connecting device, cf. FIGS. 1 and 2.

The connecting device has a first end 130 and a second end 131. It consists essentially of a distance bridging portion, comprising rod-like, rope-type or chain-like parts or a combination of the above. The section 136 of the connecting device 13, i.e., the part, directed towards the second end 131, consists of a rod-like part, to which suitably spaced fastening stops 132 are attached. The fastening stops 132 attached thereto may be formed to a any suitable size, but have to be of the same size among each other. The fastening stops 132 have a cylindrical section 133 and an adjoining conical section 134. The smallest cross-sectional diameter of the conical section 134 corresponds essentially to the cross-sectional width 135 of the rod-shaped section 136 of the connecting device 13. The distance 137 of two neighboring fastening stops 132 corresponds to the distance 176 of the two cross-pieces 161, 162 of the sliding carriage 16, which has been described above in context with the clamping device 14. The connecting device, cf. FIG. 1, at different engaging positions of the fastening stops 132 with the connecting device, is suited to bridge various distances between a fastening element on the deck of a transport vehicle 12 and the corner fittings of a container.

The clamping device 14 has a first end 140 and a second end 141. It consist essentially of two rods 144, 145 of the same length arranged parallel and spaced to each other. The first and second ends 146, 147 of the rods 144, 145 are respectively connected via a first and second end cap 148, 149, cf. FIGS. 3 and 4.

The end cap 148 has a through hole 153, which is equipped with an inner thread 152. It connects the two first ends 146 of the rods 144, 145. The through hole 153, with its inner thread 152, serves to receive a threaded spindle 142, which has, at the end facing away from the threaded part, a fastening element, with which the clamping device 14 may be attached to the deck of a transport vehicle 12 in a usual and well known manner.

The rods 144, 145 are connected at their second ends 147 via the second end cap 149, which has a through hole 151 with a radial opening 150, cf. FIG. 3. Both rods 144, 145, between their first and second ends 140, 141, are connected via an intermediate element 154 in order to maintain the same distance between the two rods. It is also possible to arrange several intermediate elements between the rods 144, 145. The axis 143 of the clamping device corresponds essentially to the axis 155 of the first end cap 148 and the axis 156 of the second end cap 149.

The rods 144, 145 serve as guides for the sliding carriage 16. The sliding carriage 16 comprises essentially two cross-pieces 161, 162, which are perpendicular to the rods 144, 145 and the axis 143 of the clamping device 14. The two cross-pieces 161, 162 are connected by a spacing element 172, which is essentially of a U-shaped cross-section and therefore open to one side. The cross-pieces 161, 162 are equipped with through holes 163, 164 which are arranged essentially at a right angle to the two cross-pieces 161, 162 and which have a radial opening 165, 166, cf. FIG. 5. The diameter of the radial opening 165, 166 is somewhat bigger than the cross-sectional width 135 of the connecting device 13 in the section 136 of the fastening stops 132. The through hole 163 of the first cross-piece 161 is provided with a recessed portion 171, which is arranged in an axial direction relative to the axis of the through hole 169 at the side 167 facing the threaded spindle 142. The diameter of the recessed portion 171, through hole 751 and through hole 164 is somewhat bigger than the diameter of the cylindrical section 133 of the fastening stop 132, so that the fastening stop 132 may be received by the axial recessed portion 171. The distance 176 between the first cross-piece 161 and the second cross-piece 162 corresponds essentially to the distance 137 of two neighboring fastening stops 132. Both cross-pieces 161, 162 are equipped with two opposite guide slots 174, 175, cf. FIG. 5, which are arranged essentially parallel to the axis 169, 170 of the through holes 163 and in the same axial plane 173 and engage the neighboring rods 144, 145. Thereby the sliding carriage 16 is movable in the direction of the arrows 177, 178.

The securing apparatus 10 is operated as follows: In order to secure the container 11, the first end 140 of the clamping device 14, having the threaded spindle arranged next to it, is fastened via a conventional fastening element to the transport vehicle 12, for example, to an eyebolt on the deck of a ship. The connecting device 13, with its first end 130 which comprises a conventional connecting element, is then connected to the standardized corner fittings of the container. After the sliding carriage 16, movable in the direction of the arrows 177, 178, has been positioned at the height of a selected fastening stop, the second end 131 of the connecting device 13 which is essentially the section 136 provided with the fastening stops 132, is connected to the clamping device 14 such, that the rod-like section of the connecting device 13 is pushed through, respectively introduced into, the radial openings 165, 166 of the sliding carriage 16. Since the cross-sectional width 135 of the rod-shaped section of the connecting device 13 is somewhat smaller then the diameter of the radial opening 165, 166, the rod-shaped section of the connecting device 13 may be easily moved in the radial direction through the radial openings 165, 166 into the through holes 163, 164. As soon as the axis of the connecting device 13 corresponds approximately to the axis 143 of the clamping device 14, the sliding carriage 16 is released or slightly moved in the direction of the arrow 177 by the operator, so that the two suitably selected fastening stops 132, which are supposed to rest in the through holes 163, 164, are moved onto the cylindrical section 133 of the fastening stop 132 until the back 138 of the fastening stop received by the first cross-piece 161 contacts the bottom of the recessed portion 171. The connecting device now is connected in a loose attachment to the clamping device 14 because the fastening stops 132 may not become disengaged in a radial direction from the radial openings 165, 166 of the through holes 163, 164 of the cross-pieces 161, 162.

The operator now has both hands free and, by turning the clamping device 14, he may move the sliding carriage 16 in the direction of the arrow 178, until the first cross-piece 161 rests at the second end cap. A further movement of the sliding carriage in the direction of the arrow 178 is impossible, so that subsequently the length of the securing apparatus comprising the connecting device 13 and the clamping device 14 is reduced by turning the clamping device 14 relative to the stagnant threaded spindle, thereby securely fastening the container relative to a transport vehicle 12.

The present invention is, of course, in no way restricted to the specific disclosure of the specification examples and drawings but also encompasses any modifications within the scope of the appended claims.

What we claim is:

1. In an apparatus for securing containers on transport vehicles, especially ships, comprising a connecting device, a first end of which is connectable to said container, and a clamping device, a first end of which is longitudinally adjustable via a threaded spindle and connectable to said transport vehicle, and with a second end of said connecting device which comprises a number of fastening stops with which a second end of said clamping device is connectable to said connecting device in suitably chosen increments, the improvement wherein:

said clamping device comprises a sliding carriage for receiving said fastening stops of said connecting device which sliding carriage is essentially freely movable in an axial direction of said clamping device;

said sliding carriage has at least two jaw-shaped cross-pieces for receiving and accommodating said fastening stops;

said cross-pieces have a respective through hole with a radial opening for receiving and accommodating said connecting device; and said through hole of a first one of said cross-pieces, on a side facing said threaded spindle, is provided with a recessed portion which is essentially arranged axially to an axis of said through hole.

2. An apparatus according to claim 1, in which two of said two cross-pieces are spaced from each other and connected via a spacing element.

3. An apparatus according to claim 2, in which said spacing element is of a U-shaped cross-section.

4. An apparatus according to claim 1, in which each of said cross-pieces is equipped with two opposite guide slots, which are arranged essentially parallel to said axis of said through hole and in a same axial plane.

5. An apparatus according to claim 4, in which said two guide slots engage two essentially parallel rods, which, at respective first and second ends, are provided with a common first and second end cap, connecting said first ends and said second ends of said two parallel rods, respectively.

6. An apparatus according to claim 5, in which said second end cap which is facing said fastening stop has a through hole with a radial opening through which said connecting device is passed.

7. An apparatus according to claim 6, in which said through hole of said second end cap has an axis, that corresponds to an axis of said clamping device and is aligned with said axis of said through hole of said cross-piece.

8. An apparatus according to claim 5, in which said first end cap facing said threaded spindle is equipped with a through hole provided with a thread which receives said threaded spindle.

9. An apparatus according to claim 8, in which said through hole of said first end cap has an axis, that corresponds to an axis of said clamping device and is aligned with said axis of said through hole of said cross-piece.

10. An apparatus according to claim 5, in which an intermediate element is arranged between said first and said second end cap and connects said rods.

11. An apparatus according to claim 1, in which said fastening stops have a cylindrical section and an adjoining conical section, which conical section has a respective smallest cross-sectional diameter that corresponds to a cross-sectional width of a rod-shaped section of said connecting device.

12. An apparatus according to claim 1, in which a distance between two neighboring ones of said fastening stops essentially corresponds to a distance between two of said cross-pieces of said sliding carriage.

* * * * *